United States Patent [19]

Brown et al.

[11] Patent Number: 4,844,203
[45] Date of Patent: Jul. 4, 1989

[54] SELF CONTAINED CONVEYOR LUBRICATING APPARATUS

[75] Inventors: Patrick A. Brown; William C. Murphy, both of Fremont, Mich.

[73] Assignee: Patco Sales & Service, Inc., Fremont, Mich.

[21] Appl. No.: 150,392

[22] Filed: Jan. 29, 1988

[51] Int. Cl.$^4$ ............................................. F16N 7/36
[52] U.S. Cl. ................................................. 184/15.3
[58] Field of Search ................ 184/6.1, 15.1, 15.2, 184/15.3; 198/500

[56] References Cited

U.S. PATENT DOCUMENTS

| | | | |
|---|---|---|---|
| 1,647,924 | 11/1927 | May . | |
| 1,840,934 | 1/1932 | Craig et al. . | |
| 1,902,601 | 3/1933 | Warner | 184/15.2 X |
| 1,919,451 | 7/1933 | Schaefer | 184/15.2 |
| 2,087,601 | 7/1937 | Leach | 184/15.2 |
| 2,293,578 | 8/1942 | Tuhy | 184/15.2 |
| 3,486,581 | 12/1969 | Matthews . | |
| 3,869,023 | 3/1975 | Thomson et al. | 184/15.2 |
| 3,895,690 | 7/1975 | Thomson et al. | 184/15.2 |
| 4,024,930 | 5/1977 | Thomson et al. | 184/15.3 X |
| 4,085,821 | 4/1978 | Kast et al. | 184/15.2 |
| 4,089,295 | 5/1978 | Thomson et al. | 118/316 |
| 4,091,492 | 5/1978 | Thomson et al. | 15/246 |
| 4,271,930 | 6/1981 | Thomson et al. | 184/15.2 |
| 4,274,509 | 6/1981 | Thomson et al. | 184/15.3 |
| 4,368,803 | 1/1983 | Dombroski et al. | 184/15.3 |
| 4,506,763 | 3/1985 | Frost et al. | 184/15.2 |
| 4,537,285 | 8/1985 | Brown et al. | 184/15.2 |
| 4,566,560 | 1/1986 | Elliott et al. | 184/15.1 |
| 4,648,486 | 5/1987 | Kayser et al. | 184/15.1 |

FOREIGN PATENT DOCUMENTS

| | | | |
|---|---|---|---|
| 1098592 | 8/1955 | France | 184/15.3 |
| 196809 | 5/1923 | United Kingdom . | |
| 632280 | 11/1949 | United Kingdom . | |

*Primary Examiner*—Leonard E. Smith
*Attorney, Agent, or Firm*—Basile and Hanlon

[57] ABSTRACT

A conveyor lubrication apparatus, for a conveyor having a plurality of interconnected and moveable elements arranged in a continuous closed loop and moveable in successive cycles about the loop, applies lubrication once for each pre-determined number of cycles of the conveyor past the lubrication apparatus. The apparatus includes a lubricant supply reservoir, fluid flow conduit connected to the lubricant supply reservoir for conducting lubricant to a position in proximity with the conveyor, valves disposed in the conduit and in proximity with the conveyor for controlling the application of lubricant to the conveyor, a conveyor driven pump for pressurizing and storing a quantity of lubricant under pressure in fluid communication with the valves, and a control circuit for controlling activation of the valves, which when activated release a portion of the lubricant under pressure onto the moveable elements of the conveyor.

9 Claims, 2 Drawing Sheets

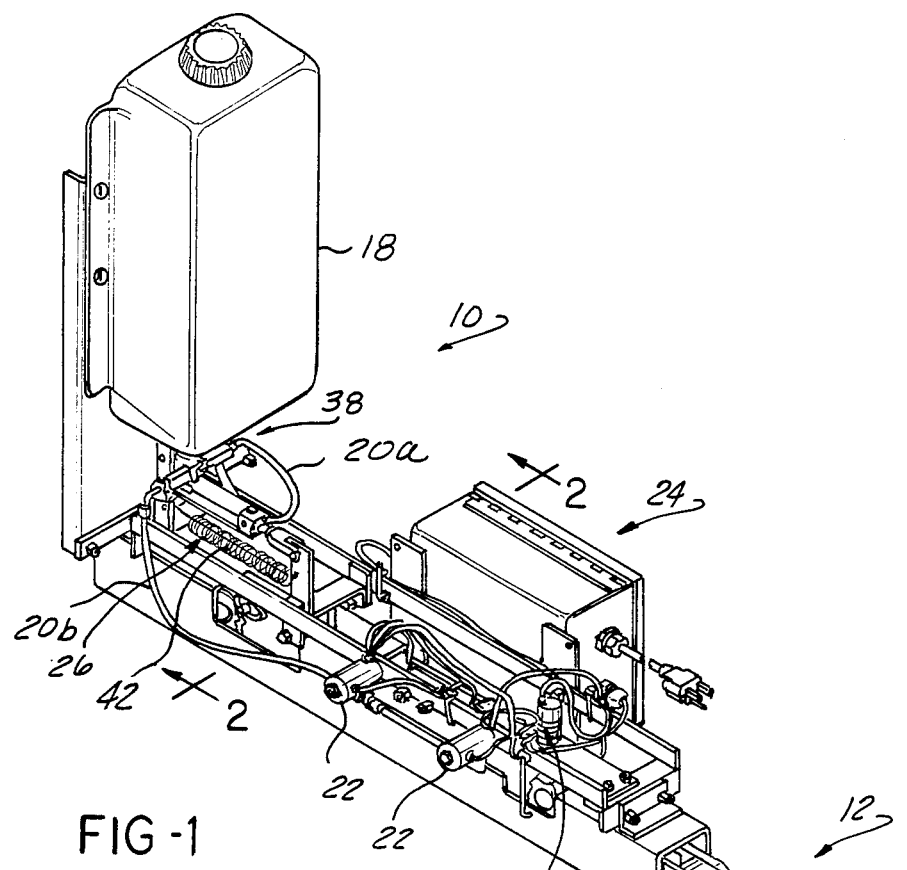
FIG-1
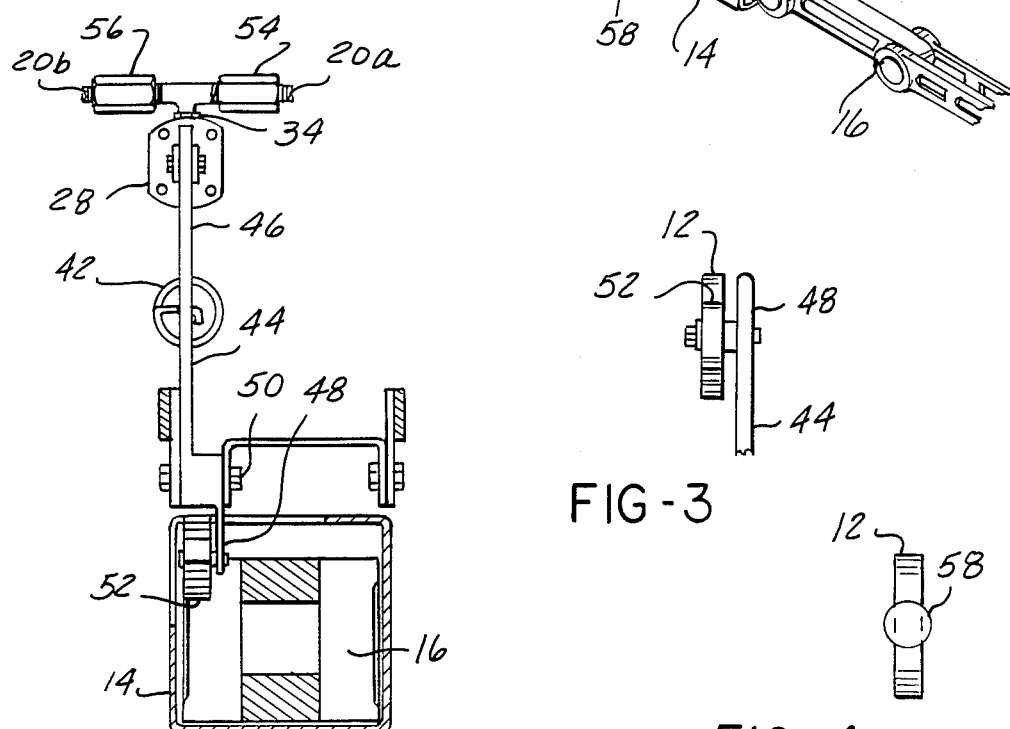
FIG-2
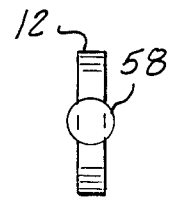
FIG-3
FIG-4

SELF CONTAINED CONVEYOR LUBRICATING APPARATUS

BACKGROUND OF THE INVENTION

1. Field of the Invention

The invention relates, in general, to conveyors and, more specifically, to an automatic conveyor lubrication apparatus.

2. Description of the Prior Art

A common method of moving parts or components along a manufacturing assembly line is by means of overhead conveyors. Such conveyors are formed of a number of wheeled trolleys which ride along a guideway or track in a continuous closed loop. The trolleys are interconnected by a chain formed of a number of connected links. The parts or components are suspended from the trolley.

The conveyor chain and wheeled trolleys include many interconnected parts which require periodic lubrication. These parts include the trolley roller bearings and the joined parts of the numerous chain links. Automated lubrication equipment has been devised to eliminate the need for manual lubrication and to provide a consistently precise quantity of lubricant to the various portions of the conveyor so as to prevent wear and the problems associated with over lubrication.

Such automated conveyor lubrication systems include a central pump-driven lubrication tank which provides lubricant under pressure throughout flow lines. Control valves or other fluid flow metering devices are energized at the appropriate time to dispense a pre-determined quantity of lubricant to the desired element of the conveyor. Typically, switches, such as photo, limit or proximity switches, detect each chain link or trolley of the conveyor as it arrives at the lubrication station and are operative through electric controlling equipment to energize the valves for the application of lubricant to the conveyor parts.

Since conveyors typically move at a slow rate of speed along a pre-determined path within a manufacturing plant, it is often times unnecessary to lubricate the parts or elements of the conveyor on each cycle as this could result in over lubrication which is costly and could cause excess lubricant to drip from the conveyor onto the parts suspended therefrom or the underlying plant area. Thus, counter apparatus as disclosed in my previous U.S. Pat. No. 4,537,285, have been devised to count the number of cycles of the conveyor past the lubricant station and to activate the lubrication apparatus once for each of a pre-determined number of cycles of the conveyor. In this manner, all of the desired parts or elements of the conveyor are lubricated once for every pre-determined number of cycles of the conveyor past the lubrication station.

However, such previously devised conveyor lubrication apparatus have not been without drawbacks. Even though the lubrication is applied only once for every predetermined number of cycles of the conveyor past the lubrication station, the central lubricant pump is continually maintained in an energized state in order to maintain pressure within the lubrication lines. This wastes power and places undue wear on the lubrication pump since the lubricant is dispensed only infrequently.

Thus it would be desireable to provide a conveyor lubrication apparatus which overcomes the problems associated with previously devised conveyor lubrication appartus. It would also be desirable to provide a conveyor lubrication apparatus with a conveyor driven pump which automatically maintains pressure within the lubrication lines while eliminating the need for pump control circuitry.

SUMMARY OF THE INVENTION

There is disclosed a unique conveyor lubrication apparatus for automatically lubricating preselected elements or components of a conveyor. The conveyor lubrication apparatus is for use with a conveyor having a plurality of interconnected moveable elements, such as conveyor chain and/or wheeled trolleys, arranged in a continuous closed loop and moveable to successive cycles about the loop. The conveyor lubrication apparatus is preferably mounted on a modified track rail of the conveyor. The conveyor lubricating apparatus automatically dispenses lubricant to the bearing and chain pins of standard chain or dual horizontal bearing chain configurations on enclosed track conveyors, or to trolley roller barrings on wheeled trolleys, during the conveyor's normal operation.

The conveyor lubrication apparatus includes a lubricant supply reservoir. Fluid flow conduit means are connected to the lubricant supply reservoir for conducting lubricant to a position in proximity with the conveyor. Valve means are disposed in the conduit means in proximity with the conveyor for controlling the application of the lubricant to the conveyor. Conveyor driven means are provided for pressurizing and storing a quantity of lubricant under pressure in fluid communication with the valve means. Control means are provided for controlling activation of the valve means once for each pre-determined number of cycles of the conveyor past the lubrication apparatus. The activation of the valve means releases a portion of the lubricant under pressure onto the desired location, such as bearing and chain pins and/or trolley roller bearings of the conveyor.

The unique conveyor lubrication apparatus of the present invention offers many advantages over previously devised conveyor lubrication apparatus. For one, the present conveyor lubrication apparatus does not require a separate electrical power source or compressed air supply to power the lubrication pump, since the lubricant is pressurized and stored under pressure by conveyor driven means, thereby saving energy. The conveyor lubrication apparatus of the present invention also includes control means and valve means to assure that the right amount of lubricant is applied to the right place at the right time, thereby eliminating over lubrication and dripping lubricant from unvalved lubricant feed lines or gravity feed lubricating lines.

BRIEF DESCRIPTION OF THE DRAWINGS

The various features, advantages and other uses of the present invention will become more apparent by referring to the following detailed description and drawing in which:

FIG. 1 is a perspective view of a conveyor lubrication apparatus constructed in accordance with the teachings of the present invention;

FIG. 2 is a cross sectional view of the conveyor lubrication apparatus taken as indicated in FIG. 1;

FIG. 3 is a partial top view of a rotating arm and attached roller showing proper alignment of the roller with a conveyor horizontal wheel;

FIG. 4 is a partial top view of a sensor switch showing proper alignment with a conveyor horizontal wheel for sensing the passage of the conveyor horizontal wheels past the sensor switch;

DESCRIPTION OF THE PREFERRED EMBODIMENTS

Figure 5:
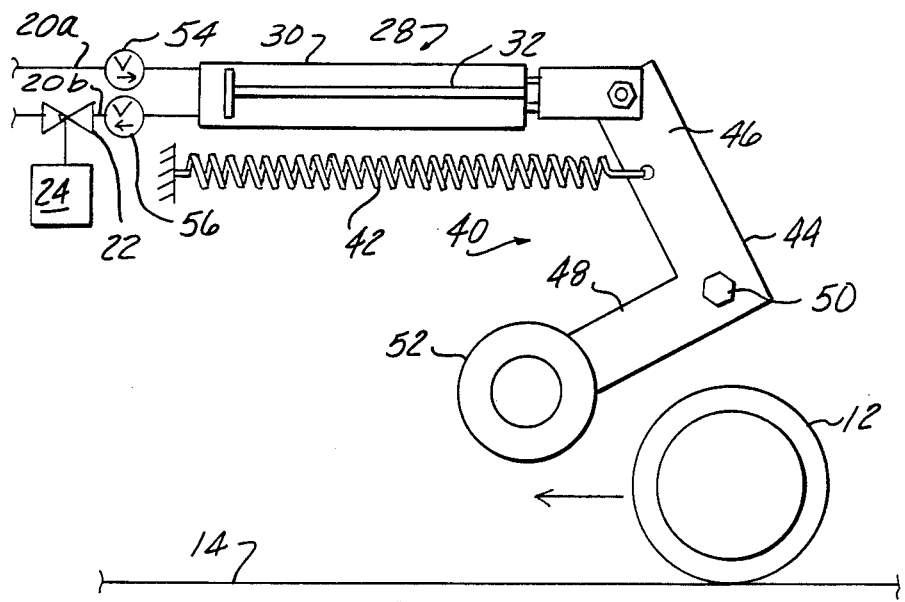
FIG. 5 is a schematic view of a conveyor driven means for pressurizing and storing a quantity of lubricant under pressure, with the conveyor driven means in an unpressurized state.

Throughout the following description and drawing, identical reference numerals are used to refer to the same component shown in multiple figures of the drawing:

Referring now to the drawing, and FIG. 1 in particular, there is illustrated a conveyor lubrication apparatus 10 which is operative to automatically lubricate various interconnected and moveable elements or parts of a moveable conveyor. The various interconnected and moveable elements or parts are denoted in general by reference numeral 12. It should be understood that reference to the various interconnected and moveable elements or parts 12 would include various configurations of the conveyor, such as a standard chain configuration, a dual horizontal bearing chain configuration, conveyor horizontal wheels, and/or other wheeled trolleys having trolley roller bearings or the like. The conveyor lubrication apparatus 10 is mounted on a track, rail, or guideway 14, which can be either a totally enclosed or partially enclosed conveyor system.

By way of example only, a conveyor can be in the form of a continuous closed-loop path. An I-beam can be provided having spaced, horizontally extending legs which are interconnected by a vertical intermediate web portion. The lower horizontal leg can form a track for a plurality of trolleys which move there along. Each of the trolleys includes two rollers or wheels, which ride along the horizontal legs of the I-beam on opposite sides of the intermediate web. Arms are connected to and depend downwardly from each of the rollers and are interconnected at a lower end by a cross-bar. A hanger is connected to the cross-bar on each trolley for supporting parts or components therefrom.

A chain 16 formed of a plurality of interconnected links or elements 12 connects each of the trolleys. Alternating links 12 are disposed about the hangers and transmit driving force through the hangers to the trolleys to cause movement of the trolleys as the chain 16 is driven in a conventional manner.

As is well known, the conveyor includes a plurality of moveable parts which are subject to wear. These parts typically include the bearings of each roller as well as the interconnected portions of the conveyor links 12. Thus, it is necessary that these parts be lubricated in order to prevent undue wear. The conveyor lubrication apparatus 10 of the present invention is constructed to provide automatic lubrication of selected elements or parts of the conveyor, such as the trolley bearings, and/or the interconnected portions of the conveyor links. The conveyor lubrication apparatus 10, as shown in FIG. 1, includes a lubrication station which is mounted at one point along the conveyor. For purposes of illustration, an enclosed track chain conveyor is shown. It should be understood that the conveyor lubrication apparatus 10 of the present invention can be readily modified for mounting on various configurations of tracks, rollers, or guideways, and can be modified for engagement with horizontal conveyor wheels in place of the interconnected links shown in the illustration. The lubrication station includes a lubricant supply reservoir 18, for example, a 1.5 gallon semi-transparent tank. Fluid flow conduit means 20 are connected to the lubricant supply reservoir 18 for conducting lubricant to a position in proximity with the conveyor. Valve means 22 are disposed in the conduit means 20 in proximity with the conveyor for controlling the application of lubricant to the interconnected and moveable elements 12. Control means 24 are provided for controlling activation of the valve means 22. An exemplary configuration of the control means 24 and valve means 22 is shown and described in my previous U.S. Pat. No. 4,537,285 which is incorporated by reference herein in its entirety. The activation of the valve means 22 is controlled by the control means 24, such that the valve means 22 are activated once for each pre-determined number of cycles of the conveyor past the lubrication apparatus. Conveyor driven means 26 are provided for pressurizing the lubricant and storing a quantity of lubricant under pressure in fluid communication with the valve means 22. Activation of the valve means 22 releases a portion of the stored lubricant under pressure onto the interconnected and moveable elements 12 of the conveyor.

The conveyor driven means 26 for pressurizing lubricant and for storing a quantity of lubricant under pressure can include a reciprocating pump means 28 having a cylinder 30, and a piston 32 slidably engaged with the cylinder 30 for movement between an extended position and a retracted position defining an expansible fluid chamber between the head of the piston 32 and the cylinder 30. The pump means 28 includes port means 34 in fluid communication with the fluid chamber for supplying lubricant from the reservoir 18 and for discharging pressurized lubricant to the valve means 22. The port means 34 is connected in fluid communication with the lubricant supply reservoir through a portion 20a of the fluid flow conduit means 20, and is connected in fluid communication with the valve means 22 through another portion 20b of the fluid flow conduit means 20. Check valve means 38 are disposed in the fluid flow conduit means 20 for directing the fluid flow in one direction from the lubricant supply reservoir 18 to the valve means 22. The check valve means 38 prevents reverse fluid flow from the reciprocating pump means 28 into the lubricant supply reservoir 18. Piston actuating means 40 are connected to an external end of the piston 32 for reciprocating the piston 32 in the cylinder 30 in response to sequential intermittent contact between the piston actuating means 40 and the plurality of interconnected and moveable elements 12 of the conveyor. Spring means 42 bias the piston 32 toward a discharge position within the cylinder 30.

The piston actuating means 40 can include a rotatable member or arm 44 having a first end 46 connected to an external end of the piston 32, a second end 48 angularly disposed with respect to the first end and in proximity with the conveyor, and a pivot point 50 disposed between the first and second ends, 46 and 48 respectively. Preferably, the rotatable arm 44 is in an angular form having the second end 48 extending parallel with respect to the path of the moveable elements 12 and downstream of the pivot point 50 with the respect to the direction of travel of the moveable elements 12. The angular rotatable arm 44 can be in the form of a right angular member having the first and second ends, 46 and 48 respectively, disposed at 90° from each other with the pivot point 50 adjacent to the corner of the right angular rotatable arm 44. A roller 52 is connected to the second end 48 of the rotatable arm 44 and is engageable with the moveable element 12 of the conveyor.

Figure 6:
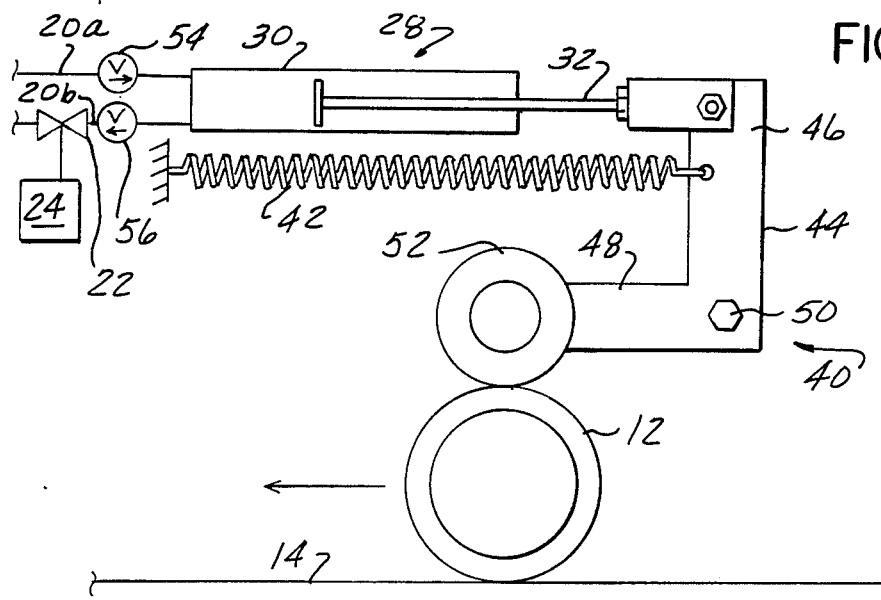
FIG. 6 is a schematic view of the conveyor driven means in a full engagement with a moveable element of a conveyor.
Figure 7:
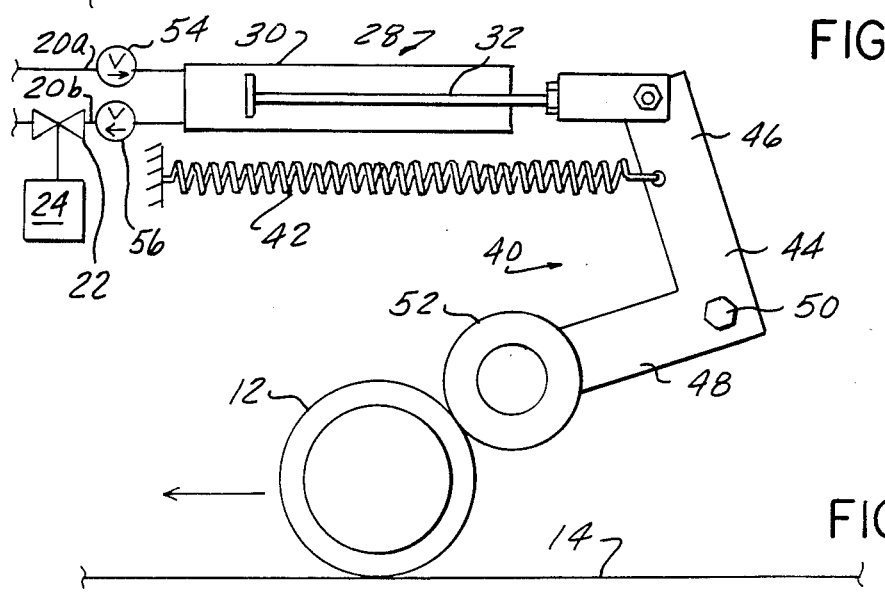
FIG. 7 is a schematic view of the conveyor driven means in a partially pressurized state after engagement with the moveable element of the conveyor.

As best shown in FIGS. 5 through 7, the interconnected and moveable elements 12 intermittently and sequentially contact the roller 52 to drive the rotatable member 44 rotationally about the pivot point 50 to reciprocate the piston 32 within the cylinder 30 to pressurize and store a quantity of lubricant under pressure within the cylinder 30 and conduit means 20b in fluid communication with the valve means 22. As the quantity of lubricant pressurized and stored within the cylinder 30 increases, due to the repetitive contact of the moveable elements 12 with the roller 52, the piston 32 will move from the fully discharged position progressively toward the fully charged position. The movement of the piston 32 in this manner will elongate spring means 42, which maintains pressure on the lubricant within the cylinder 30, and will gradually retract the roller 52 from full contact with the moveable elements 12 to a position only partially contacting the moveable elements 12 until the control means 24 actuates valve means 22 to release a portion of the lubricant onto the conveyor. When the lubricant is dispensed through the valve means 22 onto the conveyor, the piston 32 moves toward the discharged position thereby further engaging the roller 52 with the moveable elements 12 enabling the re-pressurization and storage of additional quantities of lubricant under pressure within the cylinder 30 and conduit means 20b in fluid communication with the valve means 22.

The check valve means 38 can include a first check valve 54 disposed in the conduit means 20a for flowing fluid in one direction from the lubricant supply reservoir 18 to the port means 34 of the pump means 28, while preventing reverse fluid flow from the pump means 28 toward the lubricant supply reservoir 18 during the pressurizing stroke of the piston 32. In addition, it is preferable to supply a second check valve 56 in the portion of the conduit means 20b between the port means 34 of the pump means 28 and the valve means 22 to flow fluid in one direction from the pump means 28 to the valve means 22, while preventing reverse fluid flow. The second check valve 56 prevents the loss of lubricant pressure in the conduit means 20b during the outward stroke of the piston 32, when drawing additional lubricant from the lubricant supply reservoir 18.

As best shown in FIGS. 2 and 3, for proper operation of the conveyor lubrication apparatus, the roller 52 must be properly aligned with the interconnected and moveable elements 12 such that the roller 52 will be in a direct line with the path of travel of the moveable element 12. In addition, it is preferable that the center line of the roller be dispensed above the center line of the curved surface of the moveable elements 12 which it will contact, so that the movement of the moveable element 12 will move the roller 52 around the pivot point 50 in a clockwise direction as viewed in FIGS. 5 through 7, thereby reciprocating the piston 32. In order to assure proper alignment, it may be necessary to slightly narrow the passage way of the moveable elements 12. This can be accomplished by insertion of a flat plate (not shown) adjacent the right hand wall of the track, rail or guideway 14 as viewed in FIG. 2.

As shown in FIG. 4, proper alignment is also required to assure reliable operation of the sensor 58 of the control means 24. This may be achieved in a variety of ways depending upon the type of sensor 58 selected.

The invention having been described in connection with what is presently considered to be the most practical and preferred embodiment, it should be understood that the invention is not to be limited to the disclosed embodiment but, on the contrary, is intended to cover various modifications and equivalent arrangements included within the spirit and scope of the appended claims, which scope is to be accorded the broadest interpretations so as to encompass all such modifications and equivalent structures.

The invention claimed is:

1. A conveyor lubrication apparatus for a conveyor having a plurality of interconnected and moveable elements arranged in a continuous closed loop and moveable in successive cycles about the loop, said apparatus comprising:

a lubricant supply reservoir;

fluid flow conduit means connected to the lubricant supply reservoir for conducting lubricant to a position in proximity with said conveyor;

valve means disposed in the conduit means in proximity with said conveyor for controlling the application of lubricant to said conveyor;

a reciprocating piston pump for pressurizing and storing a quantity of lubricant under pressure in fluid communication with the valve means, the pump having a cylinder, a piston slidably retained within the cylinder defining a fluid chamber for storing a quantity of fluid under pressure, and port means in fluid communication with the lubricant supply reservoir for supplying lubricant and for discharging pressurized lubricant in fluid communication with said valve means;

a first check valve for flowing fluid in one direction from said lubricant supply reservoir to said port means of said pump, while preventing reverse fluid flow;

a second check valve for flowing fluid in one direction from said port means of said pump to said valve means, while preventing reverse fluid flow;

a rotatable member for reciprocating said piston in said cylinder, said rotatable member having a first end connected to the piston, and second end in proximity with said conveyor, and a pivot point disposed between said first and second ends;

a roller connected to said second end of said member engageable in sequential intermittent contact with said moveable elements of said conveyor, wherein said plurality of interconnected and moveable elements of said conveyor sequentially and intermittently contact said roller to drive said member rotatably about said pivot point to reciprocate said piston within said cylinder such that said fluid chamber stores pressurized fluid for subsequent discharge through said valve means;

spring means for biasing said piston toward a discharge position within said cylinder, said spring means connected to said rotatable member; and control means for controlling activation of the valve means once for each pre-determined number of cycles of said conveyor past the lubrication apparatus, wherein activation of the valve means releases a portion of the lubricant stored under pressure onto said interconnected and moveable elements of said conveyor.

2. A conveyor lubrication apparatus for a conveyor having a plurality of interconnected and moveable elements arranged in a continuous closed loop and moveable in successive cycles about the loop, said apparatus comprising:
a lubricant supply reservoir;
fluid flow conduit means connected to the lubricant supply reservoir for conducting lubricant to a position in proximity with said conveyor;
valve means disposed in the conduit means in proximity with said conveyor for controlling the application of lubricant to said conveyor;
conveyor driven reciprocating pump means for presurizing and storing a quantity of lubricant under pressure in fluid communication with the valve means, said pump means having a cylinder, a piston slidably retained within the cylinder defining fluid chamber means for storing a quantity of pressurized fluid, and port means in fluid communication with the lubricant supply reservoir for supplying lubricant and for discharging pressurized lubricant in fluid communication with said valve means;
check valve means for flowing fluid in one direction from said lubricant supply reservoir to said valve means, while preventing reverse fluid flow; and
control means for controlling activation of the valve means once for each pre-determined number of cycles of said conveyor past the lubrication apparatus, wherein activation of the valve means releases a portion of the lubricant stored under pressure within said fluid chamber means onto said plurality of interconnected and moveable elements of said conveyor.

3. The apparatus of claim 2, wherein the conveyor driven pump means further comprises:
piston actuating means for reciprocating said piston in said cylinder in response to sequential intermittent contact between said piston actuating means and said plurality of interconnected and moveable elements of said conveyor such that said fluid chamber means stores pressure on said fluid stored for subsequent discharge in response to said control means activation of said valve means; and
spring means for biasing said piston toward a discharge position within said cylinder, said spring means connected to said piston actuating means for maintaining pressure on said fluid stored within said fluid chamber means.

4. The apparatus of claim 3, wherein the piston actuating means comprises:
a rotatable member having a first end connecting to the piston, a second end in proximity with said conveyor, and a pivot point disposed between said first and second ends; and
a roller connected to said second end of said member engageable with said moveable elements of said conveyor, wherein said moveable elements contact said roller to drive said member rotationally about said pivot point to reciprocate said piston within said cylinder to pressurize and store a quantity of lubricant under pressure within said cylinder and conduit means communicating with said valve means wherein said pressurized fluid within said fluid chamber means displaces said roller toward a non-contacting position such that said spring means maintains said fluid under pressure within said fluid chamber means.

5. A conveyor lubrication apparatus for a conveyor having a plurality of interconnected and moveable elements arranged in a continuous closed loop and moveable in successive cycles about the loop, said apparatus comprising:
a lubricant supply reservoir;
fluid flow conduit means connected to the lubricant supply reservoir for conducting lubricant to a position in proximity with said conveyor;
valve means disposed in the conduit means in proximity with said conveyor for controlling the application of lubricant to said conveyor;
conveyor driven means for pressurizing lubricant and for storing a quantity of lubricant under pressure in fluid communication with the valve means; and
control means for controlling activation of the valve means once for each pre-determined number of cycles of said conveyor past the lubrication apparatus wherein activation of the valve means releases a portion of the lubricant stored under pressure onto said plurality of interconnected and moveable elements of said conveyor.

6. The apparatus of claim 5, wherein the conveyor driven means for pressurizing and storing a quantity of lubricant under pressure further comprises:
reciprocating pump means for pressurizing fluid, said pump means having a cylinder, a piston slidably retained within the cylinder defining fluid chamber means for storing a quantity of pressurized fluid, port means in fluid communication with the lubricant supply for supplying lubricant and for discharging pressurized lubricant in fluid communication with said valve means;
check valve means for flowing fluid in one direction from said lubricant supply reservoir to said valve means, while preventing reverse fluid flow from said pump means into said lubricant supply reservoir; and
piston actuating means for reciprocating said piston in said cylinder in response to sequential intermittent contact between said piston actuating means and said plurality of interconnected and moveable elements of said conveyor such that said fluid chamber means stores pressurized fluid for subsequent discharge in response to said control means activation of said valve means; and
spring means for biasing said piston toward a discharge position within said cylinder, said spring means connected at one end to said piston actuating means for maintaining pressure on said fluid stored within said fluid chamber means.

7. The apparatus of claim 6, wherein the piston actuating means comprises:
a rotatable member having a first end connected to the piston, a second end in proximity with said conveyor, and a pivot point disposed between said first and second ends; and
a roller connected to said second end of said member engageable with said moveable elements of said conveyor, wherein said moveable elements contact said roller to drive said member rotationally about said pivot point to reciprocate said piston within said cylinder to pressurize and store a quantity of lubricant under pressure within said cylinder and conduit means communicating with said valve means wherein said pressurized fluid within said fluid chamber means displaces said roller toward a non-contacting position such that said spring means maintains said fluid under pressure within said fluid chamber means.

8. The apparatus of claim 6, wherein the check valve means comprises:

a first check valve disposed in said conduit means for flowing fluid in one direction from said lubricant supply reservoir to said port means of said pump means, while preventing reverse fluid flow from said pump means into said lubricant supply reservoir.

9. The apparatus of claim 8, wherein the check valve means further comprises:

a second check valve disposed in said conduit means for flowing fluid in one direction from said port means of said pump means to said valve means, while preventing reverse fluid flow.

* * * * *